United States Patent [19]

Shibata et al.

[11] Patent Number: 5,550,200
[45] Date of Patent: Aug. 27, 1996

[54] METHOD OF PRODUCING CONJUGATED DIENE-AROMATIC VINYL HYDROCARBON COPOLYMERS

[75] Inventors: Tadashi Shibata; Ryota Fujio, both of Tokyo, Japan

[73] Assignee: Bridgestone Corporation, Tokyo, Japan

[21] Appl. No.: 478,526

[22] Filed: Jun. 7, 1995

Related U.S. Application Data

[63] Continuation of Ser. No. 172,826, Dec. 27, 1993, abandoned.

[30] Foreign Application Priority Data

Dec. 24, 1992 [JP] Japan .................................... 4-344660
Nov. 29, 1993 [JP] Japan .................................... 5-297874

[51] Int. Cl.$^6$ ................................ C08F 4/46; C08F 4/48; C08F 4/56
[52] U.S. Cl. ..................... 526/174; 525/342; 525/374; 526/173; 526/175; 526/181; 526/204; 526/209; 526/335; 526/340
[58] Field of Search ..................... 526/181, 174, 526/340; 525/342

[56] References Cited

U.S. PATENT DOCUMENTS

| | | |
|---|---|---|
| 3,294,768 | 12/1966 | Wofford . |
| 4,429,090 | 1/1984 | Hall .......................................... 526/177 |
| 4,429,091 | 1/1984 | Hall .......................................... 526/181 |
| 4,647,635 | 3/1987 | Hall .......................................... 526/181 |
| 4,677,165 | 6/1987 | Kikuchi et al. . |
| 5,112,929 | 5/1992 | Hall . |
| 5,159,020 | 10/1992 | Halasa et al. . |
| 5,254,653 | 10/1993 | Halasa et al. . |
| 5,292,790 | 3/1994 | Shimizu ................................... 524/496 |

FOREIGN PATENT DOCUMENTS

| | | |
|---|---|---|
| 0215256 | 3/1987 | European Pat. Off. . |
| 62-215639 | 9/1987 | Japan . |
| 1129045 | 5/1989 | Japan . |
| 3239737 | 10/1991 | Japan . |
| 3290415 | 12/1991 | Japan . |
| 5125107 | 5/1993 | Japan . |

Primary Examiner—Fred Zitomer
Attorney, Agent, or Firm—Sughrue, Mion, Zinn, Macpeak & Seas

[57] ABSTRACT

A rubber composition, having good breaking properties, high tanδ, good wear resistance and a method for preparing a copolymer used in the rubber composition. The copolymer is a butadiene-styrene copolymer prepared in the presence of an organopotassium compound, an oxolanyl alkane and an organolithium initiator compound. The copolymer may be modified. A vulcanite of the rubber composition including 20 parts or more of the copolymer of the present invention has good properties.

15 Claims, No Drawings

METHOD OF PRODUCING CONJUGATED DIENE-AROMATIC VINYL HYDROCARBON COPOLYMERS

This is a continuation of application Ser. No. 08/172,826, filed Dec. 27, 1993, now abandoned.

FIELD OF THE INVENTION

The present invention relates to a method for producing a diene copolymer and a rubber composition including the same. More specifically, the present invention relates to a method for providing a conjugated diene copolymer and a vulcanite formed therefrom which has good tensile strength, good wear resistance, and high tan$\delta$ (i.e., the loss tangent which is defined as a measure of the ratio of energy lost to energy stored in a cyclic deformation).

BACKGROUND OF THE INVENTION

In general, rubber compositions for tire tread, in particular, for high performance tire tread, should have good balance of the properties such as high wear resistance, good wet skid resistance, good dry skid properties, good high speed stability, and good durability at high speed, without compromising steering.

At the same time, the needs of consumers have become diversified. Accordingly, numerous types of high performance tires are made on a small scale, and it is necessary to provide rubber compositions which emphasize one or more of the above-discussed properties. For example, compounds having remarkable driving grip properties, but not the best wet skid resistance have been developed, as have been those emphasizing wear resistance or wet skid properties. Recently, polymers or rubber compositions having good gripping properties, good wear resistance and good durability at high speed are desired for use as high performance tires.

To provide these rubber compositions, the relationship between wet skid resistance or dry grip properties and viscoelasticity of rubber compositions has been studied. It has been found that in order to improve wet skid resistance, tan$\delta$ at 10 to 20 Hz (in a low temperature region, i.e., around 0° C.), in particular, should be increased. Also, to improve driving grip properties, tan$\delta$ around 50° to 70° C. should be increased in order to increase hysteresis loss.

It has also been found that in order to improve wear resistance and durability at high speed, tensile strength and elongation at break (both at high temperature, i.e., around 100° C.) in particular, should be improved. The improvement in these breaking properties leads to improvement not only in wear resistance and durability at high speed but also, by controlled compounding, improvement in wet skid resistance and in dry grip properties. Most other properties can also be controlled by improving the breaking properties.

By improving certain properties of the polymer or polymer composition used for tire tread, such as the mechanical durability discussed above, performance of a tire can be improved. In this regard, it is known to improve these properties using an existing rubbery polymer or a novel polymer, i.e., by adding such polymers to the tire tread composition to make a novel composition.

As examples of the former method, a butyl rubber has been added to a butadiene-styrene copolymer, (see JP-A-62-143945), as has been a polynorbornene (see JP-A-62-143945 or see JP-A-2-142838), a polyisoprene (see JP-A-63-132949), or a cumarone-indene resin (JP-A-62-1735). As examples of the latter method, a butadiene-styrene rubber has been modified with a diphenylmethyl alcohol derivative (see JP-A- 60-61314), a diblock butadiene-styrene copolymer has been used as a rubbery component (see JP-A-1-131258), a butadiene-styrene copolymer has been polymerized using an organolithium compound and certain organic compounds such as potassium butoxide, as a rubbery component (see JP-B-44- 20463), and a butadiene-styrene copolymer has been polymerized (using a potassium salt, as a randomizer) as rubbery component (see JP-A-3-239737).

A butadiene-styrene copolymer having less than 40% styrene mono-segments and at the most 10% of styrene chemical block, having 8 or more styrene units based on total bound styrene content with low vinyl linkage in the butadiene portion, is known (see JP-A-3-239737). According to this document, however, if tetrahydrofuran is used to increase the vinyl content, styrene blocks will be broken and the styrene mono-segment content increases.

However, these methods do not result in a rubber composition having satisfactory performance as a tire.

SUMMARY OF THE INVENTION

An object of the present invention is to provide a method for preparing a conjugated diene polymer which when vulcanized has good tensile strength, wear resistance and high tan$\delta$, and to provide a rubber composition including the same.

DETAILED DESCRIPTION OF THE INVENTION

In accordance with the invention, a conjugated diene and an aromatic vinyl hydrocarbon are copolymerized in a hydrocarbon solvent using an organolithium compound as an initiator. An organopotassium compound and a monomer or a polymer of an oxolanyl alkane or a derivative thereof is added to the solvent. The organopotassium compound is a compound of formulae $R^1K$, $R^2OK$, $R^3COOK$ and $R^4R^5NK$, (where $R^1$, $R^2$, $R^3$, $R^4$ and $R^5$ each represents an alkyl group, a cycloalkyl group, an alkenyl group, an aryl group, a phenyl group or a partially substituted derivatives thereof.

The rubber composition of the present invention contains 20 to 100 parts by weight per 100 parts of the rubber of a conjugated diene polymer prepared by the copolymerization method of the present invention, 50 to 150 parts by weight of a carbon black per 100 parts by weight of the rubber, 30 to 200 parts by weight of a softener per 100 parts by weight of the rubber, and not more than 100 parts by weight of a liquid polymer per 100 parts by weight of the rubber.

The present inventors have carried out an intensive study of the relationship between the microstructure of a styrene block and the properties of a rubber composition containing the block and found that by adding a monomer, a polymer, or an oligomer of oxolanyl alkane or a derivative thereof (OAS) to a polymerization system including a potassium salt as a randomizer, and a lithium compound as an initiator, it is possible to control the microstructure of the resulting polymers to achieve desirable properties. A copolymer with a desirable microstructure in accordance with the present invention preferably contains less than 10%, more preferably, at most 8% of styrene chemical block which is defined as a styrene block having 11 or more continuous styrene units. Preferably, 20 to 50%, more preferably 30 to 40%, of linkages in a butadiene portion of the copolymer are vinyl linkages (which is to be described as vinyl content), and at least 50% of styrene microblocks which is defined as a styrene block having 4 to 10 continuous styrene units. Modifying a resulting copolymer with a modifier, as will be discussed in more detail below, such as silicon tetrachloride results in a high molecular weight copolymer which has a weight average molecular weight of $70 \times 10^4$ or more. A rubber composition including such a modified polymer and a carbon black filler is excellent for use as a high performance tire.

The styrene blocks in the polymer may contain varying amounts of styrene units. The sizes of these blocks significantly affect the properties of the resulting polymer. Styrene microblocks, i.e., styrene blocks containing 4 to 10 continuous styrene units, in particular, impart improved wear resistance and breaking properties to the resulting polymer. In accordance with the invention, the vinyl content in the butadiene portion is preferably at least 40%, more preferably, at least 45%, in order to improve low heat generation properties. These two properties cannot be achieved at the same time if significant amounts of tetrahydrofuran is used as is conventional since the larger the amount of tetrahydrofuran used, the higher the styrene mono-segment content becomes.

In the present invention, OAS is used with a potassium salt instead of tetrahydrofuran so that the styrene microblocks can be maintained without decreasing the vinyl content.

As mentioned above, the organopotassium compound used in the present invention can be a compound having one of the following formulae: $R^1K$, $R^2OK$, $R^3COOK$ and $R^4R^5NK$, where $R^1$, $R^2$, $R^3$, $R^4$ and $R^5$ each represents an alkyl group having 1 to 20 carbon atoms, a cycloalkyl group having 3 to 20 carbon atoms, an alkenyl group having 2 to 20 carbon atoms, an aryl group having 5 to 20 carbon atoms, a phenyl group, or a partially substituted derivative thereof.

Examples of suitable compounds of formula $R^1K$ include ethyl potassium, tert-amyl potassium, 3-hexenyl potassium, phenyl potassium and 4-tolyl potassium. Other suitable compounds of this formula will be apparent to one skilled in the art.

Examples of suitable compounds of formula $R^2OK$ include potassium salts of monovalent or multivalent alcohols or phenols, more specifically, potassium salts of methyl alcohol, ethyl alcohol, n-propyl alcohol, isopropyl alcohol, tert-butyl alcohol, tert-amyl alcohol, n-hexyl alcohol, cyclohexyl alcohol, 2-butenyl alcohol, 4-methyl cyclohexenyl alcohol, 3-cyclopentenyl alcohol, 3-hexenyl alcohol, 2,5-decandienyl alcohol, allyl alcohol, 1,3-dihydroxyhexane, 1,5,9-trihydroxytridecane, benzyl alcohol, phenol, catechol, resorcinol, hydroquinone, pyrogallol, 1-naphthol, 2-naphthol, 2,6-di-tert-butyl-1,4-methyl phenol, 2,4,6-tri-tert-butyl phenol, n-nonyl phenol and 1,12-dodecanediol. Other suitable compounds of this formula will be apparent to one skilled in the art.

Examples of compounds of formula $R^3COOK$ include potassium salts of monovalent or multivalent carboxylic acids, more specifically, potassium salts of lauric acid, myristylic acid, palmitic acid, stearic acid, arachic acid, linoleic acid, linolenic acid, phenyl acetic acid, benzoic acid, sebacic acid, phthalic acid and 1,8,16-hexadecane tricarboxylic acid. Other suitable compounds of this formula will be apparent to one skilled in the art.

Examples of suitable compounds of formula $R^4R^5 NK$ include potassium salts of secondary amines, more specifically, potassium salts of dimethylamine, di-n-butylamine, methyl-n-hexylamine, di(3-hexenyl)amine, diphenylamine and dibenzylamine. Other suitable compounds of this formula will be apparent to one skilled in the art.

The amount of the potassium compound used in the process of the present invention, preferably is 0.025 to 0.5 moles per mole of the organolithium compound, more preferably, 0.030 to 0.1 moles per mole of the organolithium compound. If the amount of the potassium compound is outside of this range, the styrene chemical block content becomes too high, resulting in a disadvantageous decrease in the tire tread properties discussed above.

The OAS used in the present invention can be a monomer or a polymer of an oxolanyl alkane, a derivative thereof, or mixtures thereof. Preferably, the OAS is 2,2-di(2-tetrahydrofuryl)propane.

The amount of OAS used in the present invention is preferably less than 1.5 mole equivalents (amount is calculated based on an oxygen atom in an oxolanyl ring) per mole of the organolithium compound, more preferably, at least 0.1 mole equivalents to less than 1.5 mole equivalents, more preferably, at least 0.3 mole equivalent to less than 1.0 mole equivalent. The vinyl content in the butadiene portion of the resulting polymer can be controlled by changing the amount of OAS used in the process of the invention. If the amount of OAS is more than 1.5 mole equivalents, the vinyl content in the butadiene portion exceeds 50% and the glass transition temperature of the polymer becomes very high, which is not desired. On the other hand, when the amount of OAS is less than 0.1 mole equivalent, the glass transition temperature is very low and heat resistance becomes unfavorable.

Any suitable solvents stable with regard to organolithium compound can be used in the present invention. Examples of such solvents include: aromatic hydrocarbon solvents, such as benzene, toluene, xylene; aliphatic hydrocarbon solvents, such as n-pentane, n-hexane, n-heptane; cycloaliphatic hydrocarbon solvents, such as cyclohexane. Mixtures of the foregoing solvents may also be used. Other suitable solvents will be apparent to one skilled in the art.

Any suitable organolithium compound may be used as an initiator in the present invention. Examples of such organolithium compounds include: alkyl lithium compounds, such as ethyl lithium, propyl lithium, n-butyl lithium, sec-butyl lithium, tert-butyl lithium; aryl lithium compounds, such as phenyl lithium and tolyl lithium; alkenyl lithium compounds, such as vinyl lithium and propenyl lithium; and alkylene dilithium compounds, such as tetramethylene dilithium, pentamethylene dilithium, hexamethylene dilithium and decamethylene dilithium. Preferably, the organolithium compound is n-butyl lithium or tert-butyl lithium. Mixtures of organolithium compounds may be used in the present invention. Preferably, the amount of the organolithium initiator used in the present invention is 0.2 to 30 millimoles per 100 g of total monomer, more preferably 0.5 to 10 millimoles per 100 g of total monomer.

Monomers used in the present invention are conjugated dienes and vinyl aromatic hydrocarbons.

Any suitable conjugated diene may be used in the present invention. The conjugated dienes preferably have 4 to 12 carbon atoms in one molecule, and more preferably, 4 to 8 carbon atoms in one molecule. Examples of suitable conjugated diene monomers include: 1,3-butadiene, isoprene, piperilene, 2,3-dimethyl-1,3-butadiene, 1,3-pentadiene, octadiene and mixtures thereof. Other conjugated diene monomers will be apparent to one skilled in the art. Preferably, the conjugated diene monomer is 1,3-butadiene.

Any suitable aromatic vinyl hydrocarbon may be used in the invention. Examples of suitable aromatic vinyl hydrocarbons include: styrene, α-methyl styrene, p-methyl styrene, o-methyl styrene, p-butyl styrene, vinyl naphthalene and mixtures thereof. Preferably, the aromatic vinyl hydrocarbon is styrene.

The resulting polymer can be modified after polymerization to increase its molecular weight. A coupling agent, for example, can be used as a modifier. Examples of suitable modifiers include: multivalent silicon compounds, such as silicon tetrachloride, methyl trichlorosilane and dimethyl dichlorosilane; monomers, dimers, or trimers of aromatic polyisocyanate compounds, such as 2,4-tolylenediisocyanate, diphenylmethanediisocyanate and naphthalene diisocyanate; or aromatic polyvinyl compounds, such as 2,4-divinyl benzene and 2,4,6-trivinyl benzene.

The copolymerization temperature preferably is 0° to 150° C., more preferably, 30° to 100° C.

The monomer concentration in the solution is preferably 5 to 50%, more preferably, 10 to 35%.

In the copolymerization of a conjugated diene and aromatic vinyl hydrocarbon in accordance with the invention, the vinyl aromatic hydrocarbon is preferably 3 to 50%, more preferably, 5 to 45%, of the resulting copolymer.

The pressure in the copolymerization system should be high enough to maintain a liquid phase, since polymerization is carried out by contacting the monomers with the initiator in a liquid phase. Preferably, the pressure is 0.5 to 10 kg/cm$^2$, more preferably, 1 to 5 kg/cm$^2$. Preferably, impurities, which might deactivate initiators, are removed from all the reagents used for the copolymerization before use.

Copolymerization in accordance with the invention can be carried out either batchwise or continuously, at constant temperature, or adiabatically.

A copolymer obtained by the present invention preferably contains 25 to 50 wt %, more preferably, 30 to 45 wt %, bound styrene, at least 50%, preferably at least 60%, styrene microblocks based on total bound styrene, less than 10%, preferably less than 8%, styrene chemical blocks based on total bound styrene, and 20 to 50%, preferably 30 to 40%, of vinyl content in the butadiene portion. When the bound styrene content exceeds 50 wt % or the vinyl content in the butadiene portion exceeds 50%, the glass transition temperature of the resulting polymer becomes very high and wear resistance and low temperature properties of the same are reduced. When the bound styrene content is less than 25 wt %, breaking properties are reduced. If the vinyl content in the butadiene portion is less than 20%, the heat resistance of the resulting copolymers is reduced.

The molecular weight of the copolymers obtained by the present invention is preferably $70 \times 10^4$ to $200 \times 10^4$, more preferably, $90 \times 10^4$ to $150 \times 10^4$ If the molecular weight is less than $70 \times 10^4$ the breaking strength and wear resistance of the copolymer is relatively low. If the molecular weight is over $200 \times 10^4$, the dispersion of carbon black is poor, which results in lower tensile strength and lower wear resistance.

After copolymerization, a softener, such as an aromatic oil or a liquid polymer, can be added to the copolymer obtained before solvent removal. The solvent can be removed by drying the copolymer directly or by steam stripping.

The copolymer of the present invention can be blended with natural rubber or with another diene rubber to form a rubber composition. Examples of other diene rubbers suitable for blending with the copolymers of the invention include: polyisoprene, solution polymerized butadiene-styrene copolymer, emulsion polymerized butadiene-styrene copolymer, polybutadiene, ethylene-propylene-diene copolymer, chloroprene, halogenated butyl rubber, acrylonitrile-butadiene rubber. The amount of the other diene rubber can be 0 to less than 80 wt %. When the amount of the copolymer obtained by the present invention is less than 20 wt %, that is, the amount of the other diene rubber is 80 wt % or more, no significant improvement in vulcanite properties is observed.

The amount of the carbon black used in the rubber composition of the present invention is preferably 50 to 150 parts by weight per 100 parts by weight of the rubber. If the amount of carbon black is less than 50 parts by weight per 100 parts by weight of the rubber, tensile strength may be too low, and if the same is over 150 parts by weight per 100 parts by weight of the rubber, wear resistance and processability may be too low. Preferably, the carbon black has 70 m$^2$/g or more of nitrogen surface area (N$_2$SA), 70 to 150 ml/100 g of amount of absorbed dibutyl phthalate oil (DBP), which include HAF, ISAF, SAF. If the N$_2$SA of the carbon black is not more than 70 m$^2$/g, breaking strength and wear resistance of the vulcanite obtained is low.

To vulcanize the rubber compositions of the present invention, 0.1 to 5 parts by weight of sulfur per 100 parts by weight of the rubber can be used. Preferably, the amount of sulfur is 1 to 2 parts by weight per 100 parts by weight of the rubber. If the amount of sulfur is less than 0.1 part by weight, the tensile strength, wear resistance and hysteresis loss property of the vulcanite are reduced, and if more than 5 parts by weight of sulfur is used, the vulcanite loses some of its elasticity.

Total amount of the process oil, and the liquid polymer, if used, is 30 to 200 parts by weight per 100 parts by weight of the rubber, preferably, 60 to 120 parts by weight. If this amount is outside of the above range, processability is too low.

As mentioned above, a process oil, such as paraffinic, naphthenic, aromatic process oils, and the like is used in the present invention. Preferably, the process oil is an aromatic oil.

The amount of the process oil used is 30 to 200 parts by weight per 100 parts by weight rubber, preferably, 60 to 100 parts by weight. If the amount of the process oil exceeds 200 parts by weight, the tensile strength of the vulcanite declines drastically.

The liquid polymer may be liquid polybutadiene rubber, liquid polyisoprene rubber, liquid butadiene-styrene rubber, and the like. Preferably, the liquid polymer is liquid butadiene-styrene rubber.

The amount of the liquid polymer used in the present invention is preferably not more than 100 parts by weight per 100 parts by weight of the rubber, more preferably, 20 to 60 parts by weight. If the amount of liquid polymer exceeds 100 parts by weight, the tensile strength of the vulcanite declines drastically.

Any suitable accelerator may be used in the present invention. Preferably, the accelerator is a thiazole-type accelerator, such as M (2-mercaptobenzothiazole), DM (dibenzothiazyldisulfide), and CZ (N-cyclohexyl-2-benzothiazylsulfenamide), or a guanidine-type accelerator, such as DPG (diphenylguanidine).

The amount of the accelerator is preferably 0.1 to 5 parts by weight per 100 parts by weight of the rubber, more preferably, 0.2 to 3 parts by weight.

Besides conventional antioxidants or carbon black, fillers and additives, such as silica, calcium carbonate, titanium oxide, zinc oxide, stearic acid, antioxidants, or antiozonant can be included in the rubber composition of the present invention.

The rubber composition of the present invention can be prepared by using a mixer such as a roll mixer, or internal mixer. The resulting composition can be molded into tire parts such as a tread, an under tread, a carcass, a side wall, and a bead, or other industrial materials, such as a rubber vibration isolator, and a hose. It can most suitably be used as a tire tread.

The present invention will be explained through examples but will not be restricted by these examples.

In the examples, parts and percentages are by weight unless noted otherwise.

Measurements were made as follows.

The number average molecular weight of the polymers were measured by gel permeation chromatography (G.P.C. HLC- 8020 manufactured by Toso with series of two GMH-XL type columns) and calculated by differential refractive index (RI) and UV absorption at 254 nm reduced to polystyrene. A monodispersed styrene was used as a standard.

The microstructure of the butadiene portion of the styrene-butadiene copolymer were measured by an infrared method according to D. Morero, *Chem. e. Ind.*, Vol. 41, page 758 (1959). The styrene content was obtained from the absorption intensity of the aromatic hydrogens by NMR spectroscopy.

The tensile properties were measured according to Japanese Industrial Standard K6301.

As a standard for grip properties, tanδ, which is an index for heat generation, is used. To measure tanδ, an apparatus for measurement of viscoelasticity (manufactured by Rheometrix Co.) was used. The conditions under which the measurements were carried out included a temperature of 50° C., strain at 1%, and a frequency at 15 Hz.

Wear resistance was measured with a DIN abrasion tester at room temperature and data are shown in comparison to a control.

Heat resistance was measured as reversion by Rheometer (manufactured by Monsanto) at 230° C. and in comparison to a control.

EXAMPLE 1

A 25% styrene solution in 700 g of cyclohexane, and a 15% butadiene solution in 2170 g of cyclohexane were fed into a pressure resistant 5 L reactor including a heating jacket to obtain a monomer solution. After the temperature reached 50° C., 0.028 g of 2,2-di(2-tetrahydrofuryl)propane, 0.019 g of potassium tert-amyloxide (tert-AmOK), and 0.19 g of n-butyllithium were added to start polymerization. Polymerization was carried out for about 3 hours in a temperature range of 50 to 80° C. After the polymerization was completed, the polymer was modified with 0.13 g of silicon tetrachloride for about 1 hour. Sixty parts of aromatic oil was added to the solution mixture, then solvent was removed from the mixture and the mixture was dried in a conventional manner to obtain copolymer A. The monomer proportions and properties of the resulting copolymer are shown in Table 1 and Table 2, respectively.

Copolymer A was formulated into a composition in accordance with the ingredients and proportions shown in Table 3 without blending with other rubbers, then vulcanized at 145° C. for 33 min. The properties of the resulting rubber composition are shown in Table 4.

EXAMPLES 2 AND 3

Examples 2 and 3 were carried out by the same method as in Example 1 except that the amount of 2,2-di(2-tetrahydrofuryl)propane was changed to 0.084 g and 0.14 g to obtain copolymers B and C, respectively. The copolymerization ingredients and proportions, the properties of the resulting copolymers and the properties of the rubber compositions are shown in Table 1, Table 2 and Table 4, respectively.

EXAMPLES 4, 5 AND 6

Examples 4, 5 and 6 were carried out by the same method as Example 2 except the amount of tert-AmOK was changed to 0.025 g, using 0.017 g of potassium tert-butoxide (tert-BuOK), and using 0.47 g of potassium triphenylmethoxide instead of tert-AmOK to obtain polymers D, E, and F, respectively. The copolymerization ingredients and proportions, the properties of the resulting copolymers and the properties of the resulting rubber composition are shown in Table 1, Table 2 and Table 4, respectively.

EXAMPLES 7 AND 8

Examples 7 and 8 were carried out by the same method as Example 2 except the amounts of the monomer solutions were changed to 600 g of styrene solution and 2,330 g of butadiene solution, and 900 g of styrene solution and 1,830 g of butadiene solution to obtain copolymers G and H, respectively.

COMPARATIVE EXAMPLE 1

Comparative Example 1 was carried out by the same method as in Example 1, except no 2,2-di(2-tetrahydrofuryl)propane was added to obtain copolymer I.

The copolymerization ingredients, the properties of the resulting copolymer, and the properties of the resulting rubber composition, are shown in Table 1, Table 2 and Table 4, respectively.

COMPARATIVE EXAMPLES 2 AND 3

Comparative Examples 2 and 3 were carried out by the same method as Example 1, except that 13.0 g and 1.1 g of tetrahydrofuran were added instead of 2,2-di(2-tetrahydrofuryl)propane to obtain copolymers J and K, respectively.

The copolymerization ingredients, the properties of the resulting copolymer, and the properties of the resulting rubber compositions are shown in Table 1, Table 2 and Table 4, respectively.

COMPARATIVE EXAMPLE 4 (CONTROL)

Comparative Example 4 was carried out by the same method as in Comparative Example 2, except no organopotassium compound was added to obtain copolymer L.

The copolymerization ingredients, the properties of the resulting copolymer and the properties of the rubber composition, are shown in Table 1, Table 2 and Table 4, respectively.

EXAMPLES 9, 10 AND 11

Examples 9, 10 and 11 were carried out by the same method as Example 1 except that another butadiene-styrene random copolymer was blended with polymer B in the proportions shown in Table 5.

The properties of vulcanites of the same are shown in Table 6.

COMPARATIVE EXAMPLES 5, 6 AND 7

Comparative Examples 5, 6 and 7 were carried out by the same method as in Examples 9, 10 and 11, respectively except polymer L was used instead of polymer B.

The properties of vulcanites of the same are shown in Table 6.

COMPARATIVE EXAMPLE 8

Comparative Example 8 was carried out by the same method as in Example 9, except only the other butadiene-styrene random copolymer was used as a rubber component.

The properties of vulcanites of the same are shown in Table 6.

TABLE 1

| Polymers | Content of Styrene (%) | Content of Butadiene (%) | ROK Types | ROK Amount (mmol) | Complexing Agents Types | Complexing Agents Amount (Eq./Li) |
|---|---|---|---|---|---|---|
| A (E) | 35 | 65 | t-AmOK | 0.15 | OOAS | 0.1 |
| B (E) | 35 | 65 | t-AmOK | 0.15 | OOAS | 0.3 |
| C (E) | 35 | 65 | t-AmOK | 0.15 | OOAS | 0.3 |
| D (E) | 35 | 65 | t-AmOK | 0.20 | OOAS | 0.3 |
| E (E) | 35 | 65 | t-BuOK | 0.15 | OOAS | 0.3 |
| F (E) | 35 | 65 | t-Ph$_3$COK | 0.15 | OOAS | 0.3 |
| G (E) | 30 | 70 | t-AmOK | 0.15 | OOAS | 0.3 |
| H (E) | 45 | 55 | t-AmOK | 0.15 | OOAS | 0.3 |
| I (CE) | 35 | 65 | t-AmOK | 0.15 | — | — |
| J (CE) | 35 | 65 | t-AmOK | 0.15 | THF | 60 |
| K (CE) | 35 | 65 | t-AmOK | 0.15 | THF | 5 |
| L (CE) | 35 | 65 | — | — | THF | 60 |

E: examples
CE: comparative examples
t-Buok: tertiary butoxide
t-Ph$_3$COk: triphenylmethoxide

TABLE 2

| | Polymer | Molecular weight Mw (× 10$^4$) | Molecular weight Mw/Mn | Microstructure (%) Vinyl Content in the Butadiene Portion | Styrene Portion Total | Styrene Portion Micro-block | Styrene Portion Chemical Block |
|---|---|---|---|---|---|---|---|
| E1 | A | 113 | 1.75 | 30 | 35 | 65 | 7 |
| E2 | B | 114 | 1.79 | 40 | 34 | 68 | 8 |
| E3 | C | 108 | 1.90 | 47 | 36 | 72 | 5 |
| E4 | D | 115 | 1.76 | 42 | 35 | 66 | 8 |
| E5 | E | 111 | 1.71 | 41 | 35 | 62 | 5 |
| E6 | F | 110 | 1.87 | 40 | 35 | 63 | 8 |
| E7 | G | 107 | 1.86 | 39 | 30 | 60 | 6 |
| E8 | H | 98 | 1.86 | 40 | 45 | 79 | 9 |
| CE1 | I | 93 | 1.66 | 17 | 37 | 67 | 9 |
| CE2 | J | 82 | 1.98 | 41 | 34 | 31 | 15 |
| CE3 | K | 105 | 2.00 | 25 | 35 | 35 | 18 |
| CE4 | L | 116 | 1.67 | 40 | 35 | 30 | 17 |

Notes:
Vinyl content was calculated based upon a total butadiene portion of 100%.
Molecular weights were reduced to styrene.
E: Examples
CE: Comparative Examples
Mw: Weight average molecular weight
Mn: Number average molecular weight

TABLE 3

| | |
|---|---|
| Styrene-butadiene rubber | 100 parts |
| Carbon black (ISAF) | 90 |
| Aromatic Oil | 60 |
| Stearic acid | 1 |
| Antioxidant*$^1$ | 1 |
| ZnO$_2$ | 2.5 |
| Antioxidant*$^2$ | 0.2 |
| Accelerator*$^3$ | 0.2 |
| Accelerator*$^4$ | 0.6 |
| Sulfur | 1.8 |

Notes:
*$^1$N-(1,3-Dimethylbutyl)-N'-phenyl-p-phenylenediamine
*$^2$Mixed diaryl-p-phenylene diamine
*$^3$1,3-Diphenylguanidine
*$^4$Tetramethyl thiuramdisulfide

TABLE 4

| Polymer | Elongation (%) R.T. | Elongation (%) H.T. | Tensile Strength (kgf/cm²) R.T. | Tensile Strength (kgf/cm²) H.T. | tanδ 50° C. | DIN Wear Resistance | Heat Resistance (230° C.) |
|---|---|---|---|---|---|---|---|
| E1 | A | 491 | 366 | 254 | 115 | 0.421 | 118 | 95 |
| E2 | B | 463 | 329 | 244 | 110 | 0.432 | 109 | 103 |
| E3 | C | 473 | 337 | 240 | 97 | 0.443 | 103 | 112 |
| E4 | D | 518 | 378 | 257 | 120 | 0.418 | 121 | 99 |
| E5 | E | 532 | 356 | 260 | 123 | 0.415 | 117 | 95 |
| E6 | F | 515 | 349 | 242 | 118 | 0.420 | 116 | 96 |
| E7 | G | 494 | 336 | 239 | 105 | 0.398 | 122 | 97 |
| E8 | H | 494 | 426 | 259 | 126 | 0.432 | 104 | 94 |
| CE1 | I | 552 | 453 | 244 | 122 | 0.316 | 128 | 71 |
| CE2 | J | 474 | 338 | 173 | 91 | 0.410 | 89 | 99 |
| CE3 | K | 460 | 302 | 215 | 109 | 0.352 | 116 | 86 |
| CE4 | L | 452 | 274 | 209 | 90 | 0.378 | 100 | 100 |

Notes:
DIN wear resistance was calculated based upon Comparative Example 4 having an index of 100.
Heat resistance was calculated based upon Comparative Example 4 having an index of 100.
E: Examples
CE: Comparative Examples
R.T.: room temperature (20° C.)
H.T.: high temperature (100° C.)

TABLE 5

| | Polymers in Table 1 No. | Polymers in Table 1 Amount | R-SBR Polymer for Blending Amount |
|---|---|---|---|
| E9 | B | 80 | 20 |
| E10 | B | 50 | 50 |
| E11 | B | 20 | 80 |
| CE5 | L | 80 | 20 |
| CE6 | L | 50 | 50 |
| CE7 | L | 20 | 80 |
| CE8 | none | 0 | 100 |

Notes:
Amounts were shown in parts.
E: Examples
CE: Comparative Examples
R-SBR: butadiene-styrene random copolymer

TABLE 6

| Polymer | Elongation (%) R.T. | Elongation (%) H.T. | Tensile Strength (kgf/cm²) R.T. | Tensile Strength (kgf/cm²) H.T. | tanδ 50° C. | DIN Wear Resistance | Heat Resistance (230° C.) |
|---|---|---|---|---|---|---|---|
| E9 | B | 459 | 330 | 250 | 109 | 0.427 | 110 | 98 |
| E10 | B | 442 | 329 | 245 | 114 | 0.425 | 110 | 95 |
| E11 | B | 455 | 334 | 248 | 107 | 0.424 | 109 | 94 |
| CE5 | L | 450 | 283 | 211 | 90 | 0.390 | 103 | 94 |
| CE6 | L | 444 | 290 | 215 | 89 | 0.388 | 100 | 90 |
| CE7 | L | 432 | 303 | 215 | 85 | 0.379 | 105 | 92 |
| CE8 | none | 452 | 295 | 222 | 88 | 0.378 | 101 | 70 |

Notes:
DIN wear resistance was calculated based upon Comparative Example 4 having an index of 100.
Heat resistance was calculated based upon Comparative Example 4 having an index of 100.
E: Examples
CE: Comparative Examples
R.T.: room temperature (20° C.)
H.T.: high temperature (100° C.)

As shown in Tables 4 and 6, by changing the amount of OAS within the range of the present invention, the tert-AmOK being present in the range of the present invention, the vinyl content in the butadiene portion can be controlled at high level while maintaining the amount of the styrene microblocks, resulting in copolymers with desirable molecular weights and desirable microstructures.

Similar results were obtained by changing the potassium compound.

On the other hand, the copolymer prepared without any OAS (Comparative Example 1), the copolymers prepared with tetrahydrofuran instead of OAS (Comparative Examples 2 and 3), and the copolymer prepared with tetrahydrofuran instead of an OAS without the presence of any tert-AmOK (Comparative Example 4), did not have a high vinyl content in the butadiene portion and high styrene microblock content at the same time.

Moreover, vulcanites prepared from copolymers prepared using potassium salts and an OAS, have much better properties, such as elongation, tensile strength, tanδ, or wear resistance, compared to conventional polymers.

In particular, as shown in Examples 2 and 3, good heat resistance can be achieved by increasing the vinyl content in the butadiene portion while maintaining styrene microblocks. And as shown in Example 8, when the styrene microblock content is high, the tensile strength at higher temperatures is improved remarkably, which can result in improvement in various properties of a tire at high temperature.

It has also been found that rubber compositions made by copolymers without a high styrene microblock content or a high vinyl content in the butadiene portion (Comparative Examples 1, 2, 3 and 4) do not have a good balance of the properties needed for a high performance tire.

Furthermore, as shown in Examples 9, 10, and 11, vulcanites made of polymer blends of conventional polymers and polymers obtained by the present invention have improved properties compared to those of Comparative Examples 5, 6, 7 and 8.

This improvement was obtained when rubber compositions included 20 or more parts of the copolymer of the present invention.

As described herein, when a rubber composition of the present invention is used for a tire tread, the tire has a good balance of durability at higher temperature, grip properties, and wear resistance.

Moreover, the copolymer of the present invention provides a rubber blend having pretty good tensile strength, wear resistance, and high tanδ.

While the invention has been described in detail and with reference to specific embodiments thereof, it will be apparent to one skilled in the art that various changes and modifications can be made therein without departing from the spirit and scope thereof.

What is claimed is:

1. A process for preparing a copolymer of a conjugated diene monomer and an aromatic vinyl hydrocarbon monomer, comprising the step of copolymerizing the conjugated diene monomer and aromatic vinyl hydrocarbon monomer in a hydrocarbon solvent using an organolithium initiator compound, the copolymerization being conducted in the presence of: (a) an organopotassium compound having a formula selected from the group consisting of $R^1K$, $R^2OK$, $R^3COOK$ and $R^4R^5NK$, wherein $R^1$, $R^2$, $R^3$, $R^4$ and $R^5$ each represents an alkyl group having 1 to 20 carbon atoms, a cycloalkyl group having 3 to 20 carbon atoms, an alkenyl group having 2 to 20 carbon atoms, an aryl group having 5 to 20 carbon atoms, a phenyl group or partially substituted derivatives thereof; and (b) an oxolanyl alkane.

2. The process according to claim 1, further comprising the step of increasing the molecular weight of the copolymer.

3. The process according to claim 2, wherein the step of increasing the molecular weight of the copolymer comprises contacting the copolymer with a coupling agent selected from the group consisting of a multivalent silane compound, an aromatic polyisocyanate compound and an aromatic polyvinyl compound.

4. The process according to claim 1, wherein the organopotassium compound is selected from the group consisting of ethyl potassium, tert-amyloxy potassium, potassium laurate and dimethyl amino potassium.

5. The process according to claim 1, wherein the organopotassium compound is present in an amount of 0.025 to 0.5 mole equivalent per mole of organolithium initiator compound.

6. The process according to claim 1, wherein the oxolanyl alkane is 2,2-di(2-tetrahydrofuryl) propane.

7. The process according to claim 1, wherein the oxolanyl alkane is present in an amount less than 1.5 mole equivalents as hetero atom per mole of organolithium initiator compound.

8. The process according to claim 1, wherein the organolithium initiator compound is selected from the group consisting of n-butyl lithium and sec-butyl lithium.

9. The process according to claim 1, wherein the organolithium initiator compound is present in an amount of 0.2 to 30 millimoles per 100 g of total monomer.

10. The process according to claim 1, wherein the conjugated diene monomer is 1,3-butadiene.

11. The process according to claim 1, wherein the aromatic vinyl hydrocarbon monomer is styrene.

12. The process according to claim 1, wherein the copolymerization is carried out at a temperature of 0° C. to 150° C.

13. The process according to claim 1, wherein the conjugated diene monomer and the aromatic vinyl hydrocarbon monomer are present in the hydrocarbon solvent in a total amount of 10 to 35 wt %.

14. The process according to claim 1, wherein the aromatic vinyl monomer is present in an amount, based on the total monomer feed, of 5 to 45 wt %.

15. The process according to claim 1, further comprising the step of adding an extending oil to the hydrocarbon solvent after copolymerization, the extending oil comprising a softener and a liquid polymer.

* * * * *